(12) United States Patent
Araki

(10) Patent No.: US 11,181,151 B2
(45) Date of Patent: Nov. 23, 2021

(54) TRANSMISSION

(71) Applicant: YAMAHA HATSUDOKI KABUSHIKI KAISHA, Iwata (JP)

(72) Inventor: Hitoshi Araki, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 90 days.

(21) Appl. No.: 16/855,995

(22) Filed: Apr. 22, 2020

(65) Prior Publication Data

US 2020/0332840 A1 Oct. 22, 2020

(30) Foreign Application Priority Data

Apr. 22, 2019 (JP) .............................. JP2019-080892

(51) Int. Cl.
| | |
|---|---|
| F16D 11/10 | (2006.01) |
| F16H 3/00 | (2006.01) |
| F16H 3/089 | (2006.01) |
| F16H 63/18 | (2006.01) |
| F16H 63/30 | (2006.01) |

(52) U.S. Cl.
CPC ............. F16D 11/10 (2013.01); F16H 3/006 (2013.01); F16H 3/089 (2013.01); F16H 63/18 (2013.01); F16H 2063/3093 (2013.01); F16H 2200/0052 (2013.01); F16H 2306/48 (2013.01)

(58) Field of Classification Search
CPC .......... F16D 11/10; F16H 3/006; F16H 3/089; F16H 63/18; F16H 2063/3093
USPC .......................................................... 74/331
See application file for complete search history.

(56) References Cited

U.S. PATENT DOCUMENTS

| | | | | |
|---|---|---|---|---|
| 9,568,023 | B2* | 2/2017 | Naruoka | ................. F02B 39/04 |
| 10,859,139 | B2* | 12/2020 | Yoshimura | ............ F16H 61/688 |
| 2005/0120817 | A1* | 6/2005 | Sakamoto | ........... F16H 61/0403 74/335 |
| 2012/0240701 | A1 | 9/2012 | Matsuda et al. | |
| 2015/0184585 | A1* | 7/2015 | Naruoka | ............... F16F 15/264 123/559.1 |
| 2016/0053860 | A1 | 2/2016 | Arima | |

FOREIGN PATENT DOCUMENTS

| | | |
|---|---|---|
| DE | 1202665 B | 10/1965 |
| JP | 2014029209 A | 2/2014 |

* cited by examiner

*Primary Examiner* — Ha Dinh Ho
(74) *Attorney, Agent, or Firm* — Rabin & Berdo, P.C.

(57) ABSTRACT

A transmission that suppresses a tilt of a slider in an axial direction and reduces a dimension of the slider in the axial direction for downsizing is provided. A transmission includes a fifth-speed driven gear disposed on a counter shaft, a fifth-speed driving gear that always meshes with the fifth-speed driven gear and disposed on a main shaft, and a first slider disposed on the counter shaft to be movable in the axial direction in accordance with a shift operation. The first slider includes first dog recesses. The fifth-speed driven gear includes fifth-speed dog projections configured to mesh with the first dog recesses. The fifth-speed driven gear includes a fifth-speed driven gear protrusion only on a location closer to a radially outer peripheral end thereof than the counter shaft. The fifth-speed driven gear protrusion protrudes in the axial direction so as to contact the first slider when the first slider falls in the axial direction. The protrusion length of the fifth-speed driven gear protrusion is smaller than that of the fifth-speed dog projections.

6 Claims, 8 Drawing Sheets

TRANSMISSION

CROSS-REFERENCES TO RELATED APPLICATIONS

The present application claims priority under 35 U.S.C. § 119 to Japanese Patent Application No. 2019-080892, filed Apr. 22, 2019. The contents of the application is incorporated herein by reference in their entirety.

TECHNICAL FIELD

The present teaching relates to a transmission.

BACKGROUND ART

A known transmission changes a rotation speed of a main shaft configured to rotate by a driving force output from a driving source, and transfers the rotation to a counter shaft. As such a transmission, Patent Document 1, for example, discloses a motorcycle transmission that performs a gear shift by selecting a power transfer path passing through an input-side transmission gear and an output-side transmission gear between an input shaft and a counter shaft.

Specifically, in the motorcycle transmission disclosed in Patent Document 1, a plurality of transmission gears provided on one of the input shaft or the counter shaft are fixed in an axial direction and around the shaft. On the other one of the input shaft or the counter shaft a plurality of transmission gears are fixed in the axial direction, and fitted to be rotatable around the shaft.

Patent Document 1 discloses a configuration in which a plurality of dog coupling slider rings are fixed around the other shaft to be slidable in the axial direction. Patent Document 1 also discloses a configuration in which the dog coupling slider rings and the transmission gears provided on the other shaft individually have engagement portions capable of being engaged with or being separated from each other by movement of the dog coupling slider rings in the axial direction.

With the configuration described above, in the motorcycle transmission disclosed in Patent Document 1, the movement of the dog coupling slider rings in the axial direction causes the engagement portions of the dog coupling slider rings and the engagement portions of the transmission gear provided on the other shaft to be engaged with each other. Accordingly, rotation of the one shaft is transferred to the other shaft through the plurality of transmission gears disposed on the one shaft and the plurality of transmission gears and the dog coupling slider rings disposed on the other shaft.

In the motorcycle transmission disclosed in Patent Document 1, on both end surfaces of the dog coupling slider rings in the axial direction, flat extension surfaces extending outward in the axial direction from each of the end surfaces by a predetermined extension amount are formed. Providing the extension surfaces on the dog coupling slider rings described above can prevent an over operation of the dog coupling slider rings, and partial contact between the transmission gears and the dog coupling slider rings that contact the extension surfaces.

CITATION LIST

Patent Document

Patent Document 1: Japanese Patent Application Publication No. 2014-029209

SUMMARY OF INVENTION

Recently, a transmission as disclosed in Patent Document 1 has been demanded to be further downsized. A possible method for obtaining a compact transmission is to reduce dimensions of a slider in the axial direction.

However, if the dimension of the slider in the axial direction is reduced as described above, the slider easily tilts in the axial direction. When the slider tilts in the axial direction, the slider might contact a transmission gear except for transmission gears meshing with dog portions of the slider.

It is therefore an object of the present teaching to provide a transmission that can be made compact by reducing a dimension of a slider in an axial direction while suppressing a tilt of the slider in the axial direction.

The inventor of the present teaching has studied a transmission capable of being made compact by reducing a dimension of a slider in an axial direction while suppressing a tilt of the slider in the axial direction.

Through the intensive study, the inventor of the present teaching arrived at the following configuration.

A transmission according to one embodiment of the present teaching is a transmission that changes a rotation speed of a main shaft configured to rotate by a driving force output from a driving source, and transfers the rotation to a counter shaft. The transmission includes: a first gear disposed on one of the main shaft or the counter shaft, the first gear being rotatable relative to the one of the main shaft or the counter shaft on which the first gear is disposed, the first gear being immovable in an axial direction of the one of the main shaft or the counter shaft on which the first gear is disposed, a second gear that meshes with the first gear, the second gear being disposed on the other one of the main shaft or the counter shaft on which the first gear is not provided, the second gear being rotatable and being in synchronization with the other one of the main shaft or the counter shaft on which the first gear is not provided, the second gear being immovable in an axial direction of the other one of the main shaft or the counter shaft on which the first gear is not provided, and a slider disposed on the one of the main shaft or the counter shaft on which the first gear is disposed, the slider being rotatable and being in synchronization with the one of the main shaft or the counter shaft on which the first gear is disposed, the slider being movable in the axial direction of the one of the main shaft or the counter shaft on which the first gear is disposed in accordance with a shift operation. The slider includes a first dog portion on an end portion in the axial direction of the one of the main shaft or the counter shaft on which the first gear is disposed, and is located to partially overlap with the second gear when seen in the axial direction. The first gear includes a second dog portion configured to face the first dog portion of the slider and mesh with the first dog portion. The first dog portion or the second dog portion is a dog projection projecting in the axial direction of the one of the main shaft or the counter shaft on which the first gear is disposed. At least one of the slider or the first gear includes a protrusion on a portion in which the slider and the first gear face each other and at a location closer to a radially outer periphery of the at least one of the slider or the first gear than the one of the main shaft or the counter shaft on which the first gear is disposed, the protrusion protrudes in the axial direction of the one of the main shaft or the counter shaft on which the first gear is disposed, to support the slider and the first gear between the slider and the first gear when the slider tilts in the axial direction, and the protrusion has a protrusion length smaller than a projection length of the dog projection.

The slider disposed on the one of the main shaft or the counter shaft, being rotatable always in synchronization with the shaft on which the slider is disposed, and being movable in the axial direction of this shaft in accordance with a shift operation, might tilt in the axial direction. Then, before the slider moves in the axial direction so that the first dog portion of the slider meshes with the second dog portion of the first gear, the slider might tilt in the axial direction to contact the second gear that always meshes with the first gear.

On the other hand, as described above, a portion, on which the slider and the first gear face each other, of at least one of the slider or the first gear is provided with a protrusion that protrudes in the axial direction of the shaft on which the first gear is disposed. Accordingly, even when the slider tilts in the axial direction, the slider contacts the first gear with the protrusion interposed therebetween. Thus, a tilt of the slider in the axial direction is suppressed. As a result, it is possible to prevent the slider from contacting the second gear that always meshes with the first gear.

In addition, in the axial direction of the shaft on which the first gear is disposed, the protrusion length of the protrusion is smaller than the projection length of the dog projection constituted by the first dog portion of the slider or the second dog portion of the first gear. Thus, it is possible to prevent the protrusion from being a hindrance when the first dog portion of the slider meshes with the second dog portion of the first gear.

Furthermore, the protrusion is provided only on a portion of at least one of the slider or the first gear on which the slider and the first gear face each other at a location closer to a radially outer peripheral end of the at least one of the slider or the first gear than the shaft on which the first gear is disposed. Accordingly, in addition to suppression of an increase in the weight of the member including the protrusion, advantages described above can be obtained.

With the configuration described above, a tilt of the slider in the axial direction can be suppressed, and the thickness of the slider can be reduced for downsizing.

In another aspect, the transmission according to the present teaching preferably has the following configuration. A proximal end of the dog projection includes an R portion configured to contact one of the first dog portion or the second dog portion that is not the dog projection in a state where the slider moves in the axial direction of the one of the main shaft or the counter shaft on which the first gear is disposed so that the first dog portion and the second dog portion mesh with each other. The protrusion length of the protrusion is smaller than a dimension of a gap formed between the slider and the first gear when the slider moves in the axial direction of the one of the main shaft or the counter shaft on which the first gear is disposed and the R portion of the dog projection contacts the one of the first dog portion or the second dog portion that is not the dog projection.

In a case where the slider moves in the axial direction so that the first dog portion of the slider meshes with the second dog portion of the first gear, the R portion provided on the proximal end of the dog projection contacts one of the first dog portion or the second dog portion that is not the dog projection. Accordingly, movement of the slider in the axial direction can be restricted. Thus, a gap is formed between the slider and the first gear in a portion where the slider and the first gear are not in contact with each other.

As described above, in at least one of the slider or the first gear, a protrusion length of the protrusion provided on a portion where the slider and the first gear face each other is smaller than a dimension of the gap. Accordingly, the slider does not tilt in the axial direction, and when the first dog portion of the slider meshes with the second dog portion of the first gear, it is possible to prevent contact between the slider and the first gear with the protrusion interposed therebetween. Thus, it is possible to prevent the protrusion from hindering meshing between the first dog portion of the slider and the second dog portion of the first gear.

The dimension of the gap refers to a dimension, in the axial direction, of the gap formed by the R portion provided on the proximal end of the dog projection when the first dog portion of the slider and the second dog portion of the first gear mesh with each other as described above.

In another aspect, the transmission according to the present teaching preferably has the following configuration. The protrusion is of a ring shape on at least one of the slider or the first gear when seen in the axial direction of the one of the main shaft or the counter shaft on which the first gear is disposed.

With this configuration, even when the slider tilts in the axial direction of the shaft, the protrusion is located between the slider and the first gear with a minimum gap between the slider and the first gear, as intended. Thus, it is further ensured to prevent contact between the slider and the second gear when the slider tilts in the axial direction.

In another aspect, the transmission according to the present teaching preferably has the following configuration. The protrusion includes a plurality of protrusions provided on at least one of the slider or the first gear.

As described above, the plurality of protrusions are provided on at least one of the slider or the first gear so that it is further ensured to prevent contact between the slider and the second gear when the slider tilts in the axial direction.

In another aspect, the transmission according to the present teaching preferably has the following configuration. The protrusion is provided on a portion of the first gear facing the slider. Further, the first dog portion of the slider may be a recess, and the slider may be located at one end of the one of the main shaft or the counter shaft in the axial direction thereof. The second dog portion of the first gear may be the dog projection that is disposed on a side surface of the first gear that faces a side surface of the slider. The dog projection may projects in the axial direction of the one of the main shaft or the counter shaft, and be configured to mesh with the first dog portion.

Accordingly, since no protrusion is provided on the slider, an increase in the weight of the slider can be prevented. Thus, it is possible to avoid difficulty in movement of the slider in the axial direction by an increase in the weight of the slider.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, elements, components, and/or their equivalents but do not preclude the presence or addition of one or more other features, steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include electrical connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In this description, embodiments of a transmission according to the present teaching will be described.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

[Driving Source]

A driving source herein refers to a device that applies a driving force to wheels. The driving source include devices, such as an engine and a motor capable of applying a driving force.

[Face]

The expression "two members face each other" herein means that two members face each other and only space is present between these two members. That is, in a case where members face each other, a gas such as air may be present between the members.

[Immovable]

The term "immovable" herein refers to a state where two members are not movable relative to each other. The term "immovable" includes not only a case where the distance of relative movement of two members is zero but also a case where the two members slightly move to such a degree that no functions occur by relative movement of the two members. Examples of a method for making two members immovable relative to each other includes a method in which an additional member is fitted between the two members so as to restrict relative movement of the two members, a method in which the two members are mechanically connected to each other by fitting or with a fastening member, and a method in which the two members are joined together by welding.

[R Portion]

An R portion herein refers to a curved portion at a corner of a member whose cross-sectional area gradually changes to alleviate stress. The R portion herein includes a case where a center of curvature is located outside the member and a case where the center of curvature is located inside the member.

Advantageous Effects of Invention

An embodiment of the present teaching provides a transmission that can be made compact by reducing a dimension of a slider in an axial direction while suppressing a tilt of the slider in the axial direction.

DESCRIPTION OF EMBODIMENTS

Figure 1:
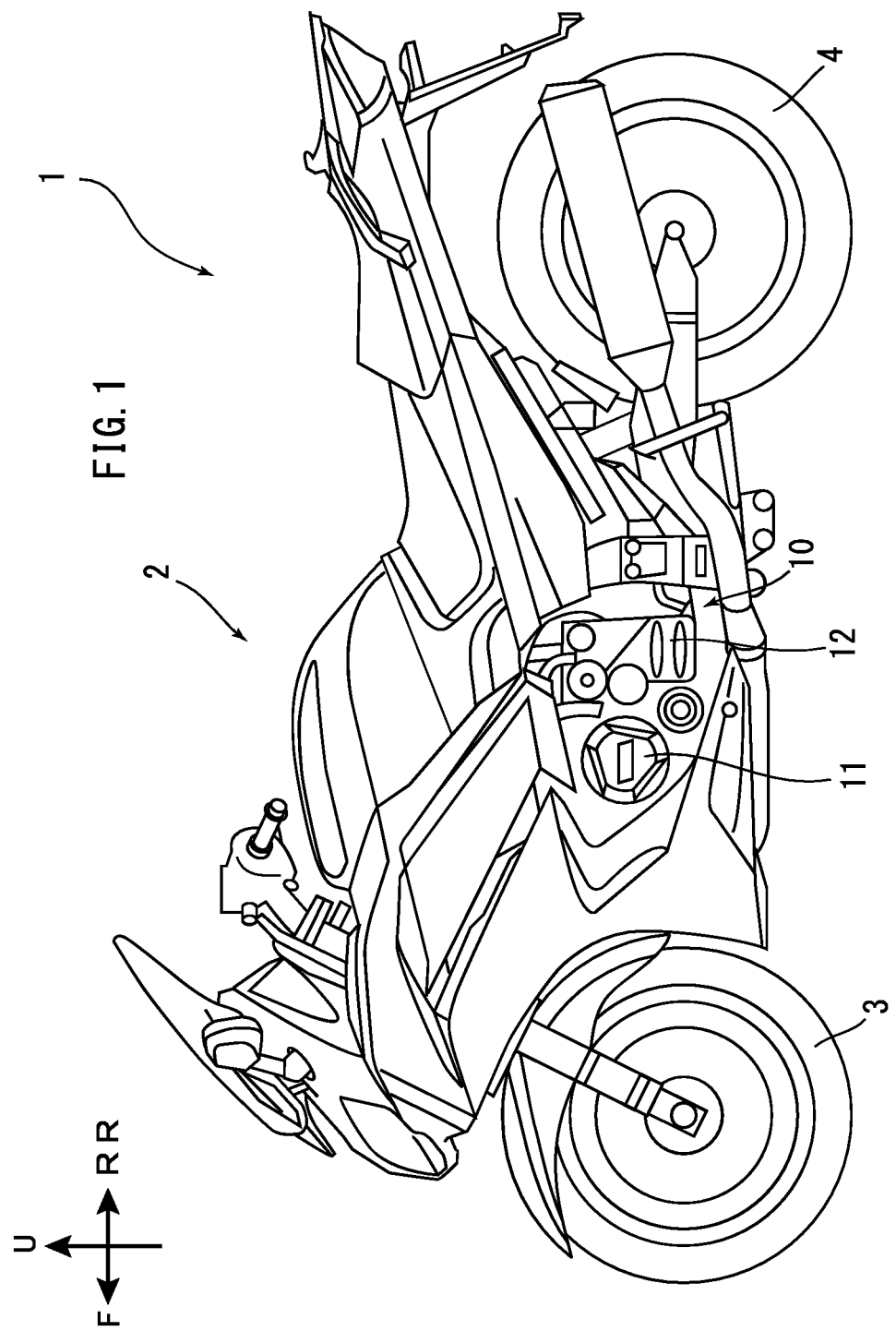
FIG. 1 is a left side view of a vehicle including a transmission according to an embodiment.

Each embodiment will be described hereinafter with reference to the drawings. The dimensions of the components in the drawings do not strictly represent actual dimensions of the components and dimensional proportions of the components.

In the following description, arrow F in the drawing represents the forward direction of a vehicle. Arrow RR in the drawing represents the rearward direction of the vehicle. Arrow U in the drawing represents the upward direction of the vehicle. The directions of "forward", "rearward", "left", and "right" respectively refer to the directions of forward, rearward, left and right when seen from a driver of the vehicle.

<Overall Configuration>

FIG. 1 illustrates a left side view of a vehicle 1 according to an embodiment of the present teaching. The vehicle 1 is, for example, a motorcycle. The vehicle 1 includes a vehicle body 2, a front wheel 3, a rear wheel 4, and an engine unit 10.

The vehicle body 2 includes an unillustrated frame. The engine unit 10 for supplying a rotation driving force to the rear wheel 4 is attached to the frame of the vehicle body 2. The engine unit 10 includes an engine 11 as a driving source and a transmission 12 for changing the speed of a driving force output from the engine 11. The engine 11 has a configuration similar to that of a typical engine. Thus, a detailed description of the engine 11 will be omitted.

The transmission 12 includes a plurality of gear stages, and shifts the gear stages to thereby change a driving force transferred from the engine 11 to the rear wheel 4. Specifically, the transmission 12 includes a transmission mechanism 20 (see FIG. 2), an unillustrated clutch, and an unillustrated shift mechanism.

The clutch is configured to enable switching between transfer and non-transfer of rotation from the engine 11 to the transmission 12. That is, a driving force is transferred to the transmission 12 from the engine 11 through the clutch. The shift mechanism causes a plurality of sliders 60 of the transmission 12 described later to move in accordance with a gear-shift operation to thereby shift the gear stages of the transmission 12. The clutch and the shift mechanism have configurations similar to those of a typical clutch and a typical shift mechanism. Thus, a detailed description of the clutch and the shift mechanism will be omitted.

<Transmission Mechanism>

Figure 2:
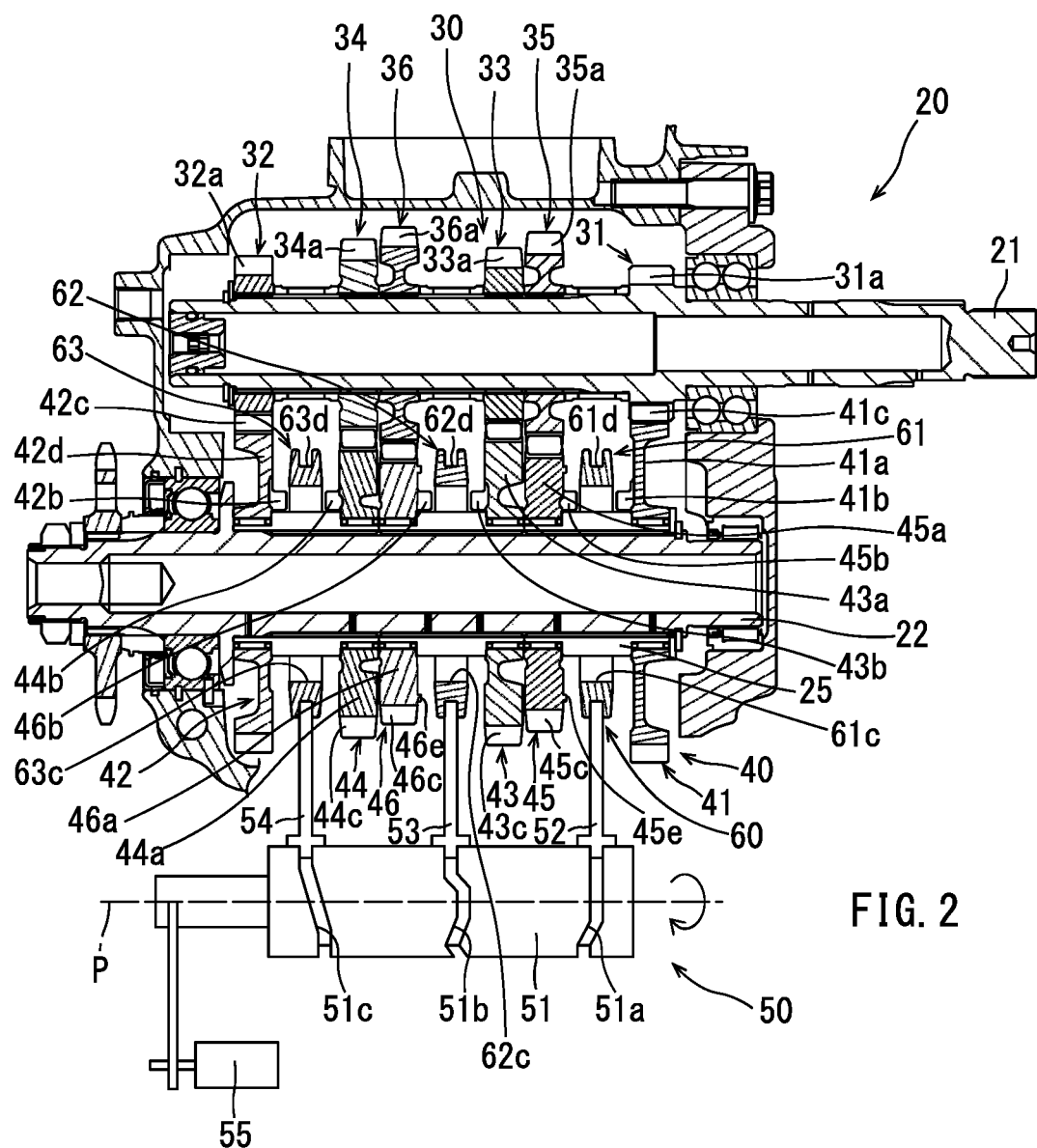
FIG. 2 is a cross-sectional view illustrating a schematic configuration of the transmission.

FIG. 2 illustrates a schematic configuration of the transmission mechanism 20 of the transmission. FIG. 8 illustrates a schematic configuration of the transmission mechanism 20, and configurations of a first slider 61 and a fifth-speed driven gear 45. FIG. 8 is the same as FIGS. 2 and 7, and thus, a detailed description of FIG. 8 will be omitted.

The transmission mechanism 20 is connected to an unillustrated crankshaft of the engine 11. The transmission mechanism 20 changes a torque transferred from the crankshaft to a predetermined torque and outputs the predetermined torque.

The transmission mechanism 20 is a multistep transmission mechanism. The transmission mechanism 20 includes a main shaft 21, a counter shaft 22 disposed in parallel with the main shaft 21, a plurality of driving gears 30, a plurality of driven gears 40, a sequential shift mechanism 50, and the plurality of sliders 60. The sequential shift mechanism 50 includes a shift cam 51, a first shift fork 52, a second shift fork 53, and a third shift fork 54.

The main shaft 21 is provided with the plurality of driving gears 30. The plurality of driving gears 30 are transmission gears constituting a part of a plurality of gear stages. The plurality of driving gears 30 include a first-speed driving gear 31, a second-speed driving gear 32, a third-speed driving gear 33, a fourth-speed driving gear 34, a fifth-speed driving gear 35 (second gear), and a sixth-speed driving gear 36.

The first-speed driving gear 31, the second-speed driving gear 32, the third-speed driving gear 33, the fourth-speed driving gear 34, the fifth-speed driving gear 35, and the sixth-speed driving gear 36 are cylindrical gears such as spur gears. That is, the first-speed driving gear 31 includes a first-speed driving gear tooth portion 31a on an outer peripheral portion thereof. The second-speed driving gear 32 includes a second-speed driving gear tooth portion 32a on an outer peripheral portion thereof. The third-speed driving gear 33 includes a third-speed driving gear tooth portion 33a on an outer peripheral portion thereof. The fourth-speed driving gear 34 includes a fourth-speed driving gear tooth portion 34a on an outer peripheral portion thereof. The fifth-speed driving gear 35 includes a fifth-speed driving gear tooth portion 35a on an outer peripheral portion thereof. The sixth-speed driving gear 36 includes a sixth-speed driving gear tooth portion 36a on an outer peripheral portion thereof. The first-speed driving gear 31, the second-speed driving gear 32, the third-speed driving gear 33, the fourth-speed driving gear 34, the fifth-speed driving gear 35, and the sixth-speed driving gear 36 may be spiral gears and the like as long as these gears are cylindrical gears.

The first-speed driving gear 31 is disposed integrally with the main shaft 21. That is, the first-speed driving gear tooth portion 31a is disposed integrally with the main shaft 21.

Each of the second-speed driving gear 32, the third-speed driving gear 33, the fourth-speed driving gear 34, the fifth-speed driving gear 35, and the sixth-speed driving gear 36 is rotatable always in synchronization with the main shaft 21, and is immovable in the axial direction relative to the main shaft 21. With the foregoing configuration, the plurality of driving gears 30 are rotatable together with the main shaft 21.

In this embodiment, the plurality of driving gears 30 are disposed on the main shaft 21 such that the first-speed driving gear 31, the fifth-speed driving gear 35, the third-speed driving gear 33, the sixth-speed driving gear 36, the fourth-speed driving gear 34, and the second-speed driving gear 32 are arranged in this order.

The counter shaft 22 is provided with the plurality of driven gears 40 that always mesh with the plurality of driving gears 30. The plurality of driven gears 40 are transmission gears constituting a part of a plurality of gear stages. The driven gears 40 include a first-speed driven gear 41, a second-speed driven gear 42, a third-speed driven gear 43, a fourth-speed driven gear 44, a fifth-speed driven gear 45 (first gear), and a sixth-speed driven gear 46. Specific configurations of the first-speed driven gear 41, the second-speed driven gear 42, the third-speed driven gear 43, the fourth-speed driven gear 44, the fifth-speed driven gear 45, and the sixth-speed driven gear 46 will be described later. The counter shaft 22 is a shaft on which the first gear is provided. The main shaft 21 is a shaft on which the first gear is not provided.

Each of the first-speed driven gear 41, the second-speed driven gear 42, the third-speed driven gear 43, the fourth-speed driven gear 44, the fifth-speed driven gear 45, and the sixth-speed driven gear 46 is rotatable relative to the counter shaft 22, and is immovable in the axial direction relative to the counter shaft 22. With the foregoing configuration, the plurality of driven gears 40 and the counter shaft 22 are rotatable relative to each other.

The first-speed driving gear 31 always meshes with the first-speed driven gear 41. The second-speed driving gear 32 always meshes with the second-speed driven gear 42. The third-speed driving gear 33 always meshes with the third-speed driven gear 43. The fourth-speed driving gear 34 always meshes with the fourth-speed driven gear 44. The fifth-speed driving gear 35 always meshes with the fifth-speed driven gear 45. The sixth-speed driving gear 36 always meshes with the sixth-speed driven gear 46.

As described above, the transmission mechanism 20 is a so-called gear transmission mechanism in which the plurality of driving gears 30 always mesh with the plurality of driven gears 40 in a one-to-one relationship.

The plurality of sliders 60 are disposed on the counter shaft 22 to be movable in the axial direction. The plurality of sliders 60 include the first slider 61, a second slider 62, and a third slider 63. The first slider 61, the second slider 62, and the third slider 63 are rotatable always in synchronization with the counter shaft 22, and is movable in the axial direction relative to the counter shaft 22. In this embodiment, each of the first slider 61, the second slider 62, and the third slider 63 is not provided with a gear.

The first slider 61 is disposed to be movable in the axial direction of the counter shaft 22 between the first-speed driven gear 41 and the fifth-speed driven gear 45. The first slider 61 is caused to move in the axial direction of the counter shaft 22 by the first shift fork 52 of the sequential shift mechanism 50. As will be described later, when the gear stage is the first speed, the first slider 61 is connected to the first-speed driven gear 41 to be rotatable together with the first-speed driven gear 41. When the gear stage is the fifth speed, the first slider 61 is connected to the fifth-speed driven gear 45 to be rotatable together with the fifth-speed driven gear 45.

The second slider 62 is disposed to be movable in the axial direction of the counter shaft 22 between the third-speed driven gear 43 and the sixth-speed driven gear 46. The second slider 62 is caused to move in the axial direction of the counter shaft 22 by the second shift fork 53 of the sequential shift mechanism 50. As will be described later, when the gear stage is the third speed, the second slider 62 is connected to the third-speed driven gear 43 to be rotatable together with the third-speed driven gear 43. When the gear stage is the sixth speed, the second slider 62 is connected to the sixth-speed driven gear 46 to be rotatable together with the sixth-speed driven gear 46.

The third slider 63 is disposed to be movable in the axial direction of the counter shaft 22 between the fourth-speed driven gear 44 and the second-speed driven gear 42. The third slider 63 is caused to move in the axial direction of the counter shaft 22 by the third shift fork 54 of the sequential shift mechanism 50. As will be described later, when the gear stage is the fourth speed, the third slider 63 is connected to the fourth-speed driven gear 44 to be rotatable together with the fourth-speed driven gear 44. When the gear stage is the second speed, the third slider 63 is connected to the second-speed driven gear 42 to be rotatable with the second-speed driven gear 42.

As described above, the plurality of driven gears 40 and the plurality of sliders 60 are disposed on the counter shaft 22 such that the first-speed driven gear 41, the first slider 61, the fifth-speed driven gear 45, the third-speed driven gear 43, the second slider 62, the sixth-speed driven gear 46, the fourth-speed driven gear 44, the third slider 63, and the second-speed driven gear 42 are arranged in this order from a position close to one end of the counter shaft 22.

In the transmission mechanism 20, the first slider 61, the second slider 62, and the third slider 63 are caused to move along the counter shaft 22 by the first shift fork 52, the second shift fork 53, and the third shift fork 54 of the sequential shift mechanism 50, in accordance with the gear stage. Accordingly, in the transmission mechanism 20, a combination of a driving gear and a driven gear for transferring a driving force is selected from the plurality of driving gears 30 and the plurality of driven gears 40.

First, a configuration of the sequential shift mechanism 50 will be briefly described with reference to FIG. 2.

As already described above, the sequential shift mechanism 50 includes the shift cam 51, the first shift fork 52, the second shift fork 53, and the third shift fork 54.

As illustrated in FIG. 2, the shift cam 51 of the sequential shift mechanism 50 is rotatable around an axis P by a driving source 55 such as a motor. The shift cam 51 may be rotatable by an operation of a driver.

An outer peripheral surface of the shift cam 51 has cam grooves 51*a* through 51*c*. Each of the cam grooves 51*a* through 51*c* extends circumferentially on the outer peripheral surface of the shift cam 51, and is arranged in the axial direction of the shift cam 51. The configuration of the cam grooves 51*a* through 51*c* according to this embodiment is the same as that of a typical cam groove (see, for example, Japanese Patent Application Publication No. 2015-117798), and thus, the detailed description thereof will be omitted. Each of the cam grooves 51*a* through 51*c* is provided on the outer peripheral surface of the shift cam 51 such that the position in the axial direction of the shift cam 51 varies depending on a position of the shift cam 51 in the circumferential direction. One end of each of the first shift fork 52, the second shift fork 53, and the third shift fork 54 is located in a corresponding one of the cam grooves 51*a* through 51*c*.

Although not specifically illustrated, the first shift fork 52, the second shift fork 53, and the third shift fork 54 are disposed on a guide shaft disposed in parallel to the axis of the shift cam 51 to be movable in the axial direction of the guide shaft. The other end of the first shift fork 52 is connected to a first slider groove portion 61*d* of the first slider 61 described later. The other end of the second shift fork 53 is connected to a second slider groove portion 62*d* of the second slider 62 described later. The other end of the third shift fork 54 is connected to a third slider groove portion 63*d* of the third slider 63 described later.

With the configuration described above, when the shift cam 51 rotates by a rotation driving force output from the driving source 55, the first shift fork 52, the second shift fork 53, and the third shift fork 54 move in the axial direction of the shift cam 51 along the cam grooves 51*a* through 51*c* provided on the outer peripheral surface of the shift cam 51. The rotation of the shift cam 51 causes the first slider 61, the second slider 62, and the third slider 63 to move in the axial direction along the counter shaft 22 through the first shift fork 52, the second shift fork 53, and the third shift fork 54. Thus, the sequential shift mechanism 50 determines the positions of the first slider 61, the second slider 62, and the third slider 63 in the axial direction relative to the counter shaft 22.

The configurations of the first slider 61, the second slider 62, and the third slider 63 will now be described in detail.

Each of the first slider 61, the second slider 62, and the third slider 63 is a flat ring-shaped member through which the counter shaft 22 penetrates.

Figure 3:
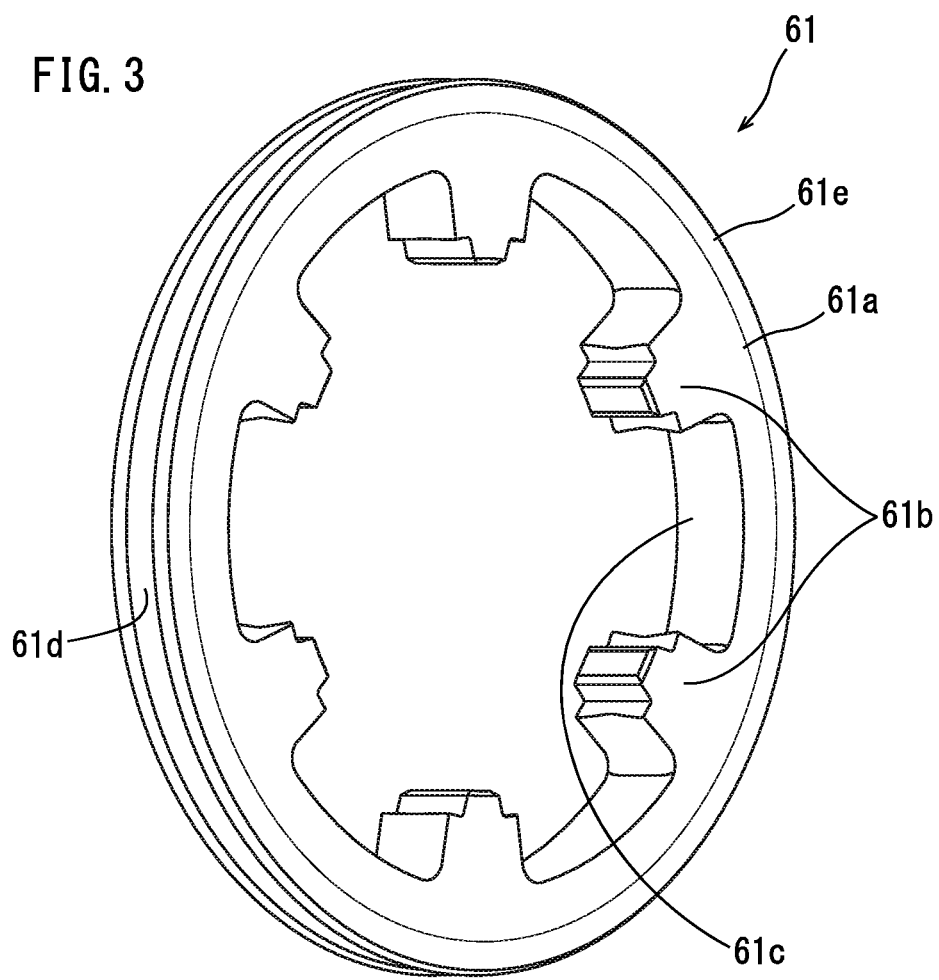
FIG. 3 is a perspective view illustrating a schematic configuration of a first slider.

FIG. 3 is a perspective view illustrating a schematic configuration of the first slider 61. As illustrated in FIG. 3, the first slider 61 includes a ring-shaped first slider body 61*a* and a plurality of first slider projections 61*b*. The plurality of first slider projections 61*b* project inward from an inner peripheral portion of the first slider body 61*a*. The plurality of first slider projections 61*b* are arranged at regular intervals in the circumferential direction of the first slider body 61*a*. In this embodiment, the first slider body 61*a* is integrally provided with six first slider projections 61*b*. Alternatively, each of the first slider body and the plurality of first slider projections may be formed separately.

Although not particularly shown, projection ends of the plurality of first slider projections 61*b* are located in unillustrated grooves of a cylindrical collar 25 disposed on the outer peripheral surface of the counter shaft 22. The collar 25 is attached to the outer peripheral surface of the counter shaft 22 to be rotatable together with the counter shaft 22. The grooves are provided on the outer peripheral surface of the collar 25. With this configuration, the first slider 61 is rotatable always in synchronization with the counter shaft 22, and is movable in the axial direction relative to the counter shaft 22.

As illustrated in FIG. 3, in the first slider 61, the plurality of first slider projections 61*b* form first dog recesses 61*c* (first dog portions). Specifically, each of the first dog recesses 61*c* is formed between adjacent ones of the plurality of first slider projections 61*b* that are adjacent to each other in the circumferential direction of the first slider 61. The first dog recesses 61*c* are dog portions that are not dog projections.

In a case where the gear stage is the first speed, first-speed dog projections 41*b* of the first-speed driven gear 41 described later are located in the first dog recesses 61*c*. In a case where the gear stage is the fifth speed, fifth-speed dog projections 45b of the fifth-speed driven gear 45 described later are located in the first dog recess 61c. On the other hand, in a case where the gear stage is neither the first speed nor the fifth speed, the first-speed dog projections 41b and the fifth-speed dog projections 45b are not located in the first dog recess 61c (in a state illustrated in FIG. 2).

As illustrated in FIG. 3, the first slider groove portion 61d is provided on the outer peripheral surface of the first slider body 61a across the entire periphery in the circumferential direction. The front end of the first shift fork 52 of the sequential shift mechanism 50 is located in the first slider groove portion 61d. Accordingly, the first slider 61 moves in the axial direction along the counter shaft 22 in accordance with movement of the first shift fork 52.

A first slider tapered portion 61e is provided on an outer peripheral portion at each side surface of the first slider body 61a such that the thickness of the first slider tapered portion 61e decreases radially outward. The first slider tapered portion 61e can prevent the first slider 61 from contacting the fifth-speed driving gear 35 that always meshes with the fifth-speed driven gear 45, even when the first slider 61 falls and tilts toward the fifth-speed driven gear 45 in the axial direction of the counter shaft 22, which will be described later. In addition, the first slider tapered portion 61e can reduce the weight of the first slider 61. The first slider tapered portion may be provided on only one of the side surfaces of the first slider body. No first slider tapered portions may be provided on the side surfaces of the first slider body.

The second slider 62 and the third slider 63 have configurations similar to that of the first slider 61, and thus, description thereof will be omitted. In FIG. 2, reference character 62c denotes a second dog recess of the second slider 62, and reference character 62d denotes a second slider groove portion provided on an outer peripheral surface of the second slider 62. In FIG. 2, reference character 63c denotes a third dog recess of the third slider 63, and reference character 63d denotes a third slider groove portion provided on an outer peripheral surface of the third slider 63.

A front end of the second shift fork 53 of the sequential shift mechanism 50 is located in the second slider groove portion 62d. A front end of the third shift fork 54 of the sequential shift mechanism 50 is located in the third slider groove portion 63d. Accordingly, the second slider 62 moves in the axial direction along the counter shaft 22 in accordance with movement of the second shift fork 53. The third slider 63 moves in the axial direction along the counter shaft 22 in accordance with movement of the third shift fork 54.

Figure 4:
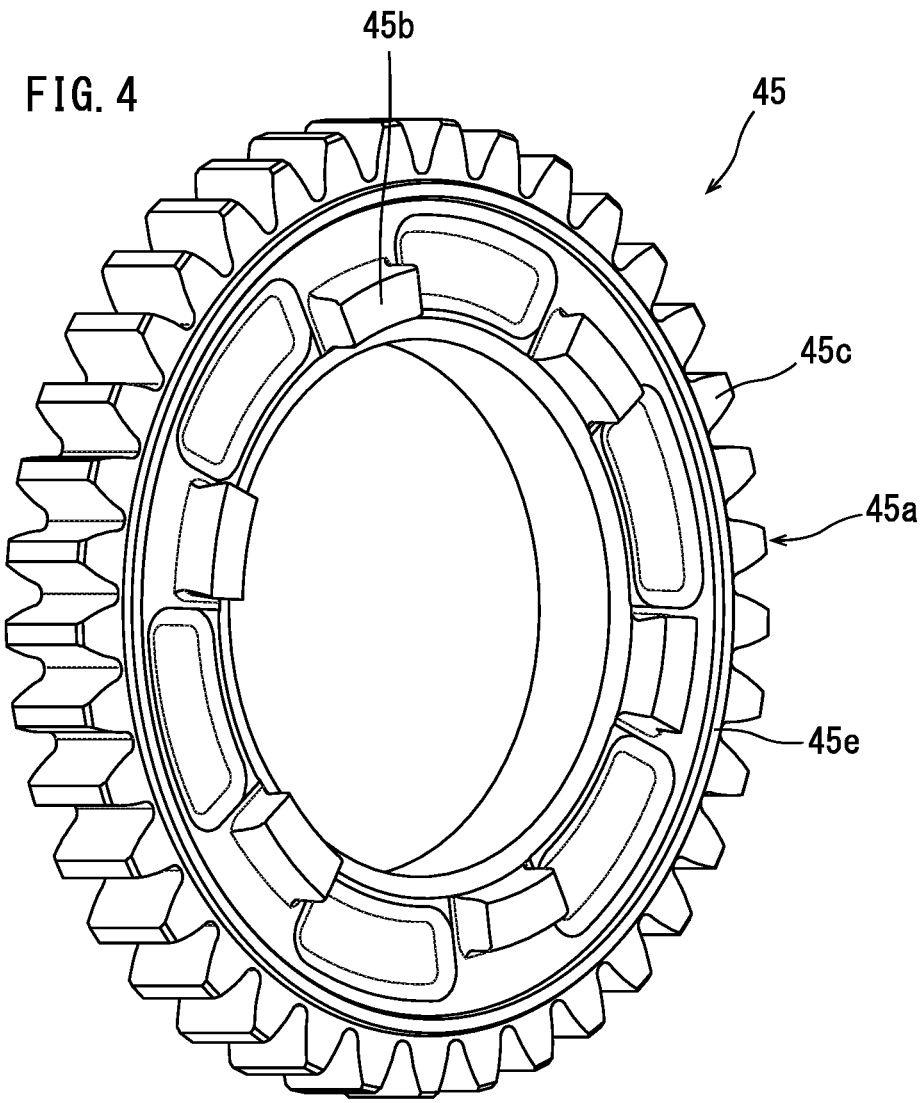
FIG. 4 is a perspective view illustrating a schematic configuration of a fifth-speed driven gear.

Next, configurations of the first-speed driven gear 41, the second-speed driven gear 42, the third-speed driven gear 43, the fourth-speed driven gear 44, the fifth-speed driven gear 45, and the sixth-speed driven gear 46 will be described in detail. The first-speed driven gear 41, the second-speed driven gear 42, the third-speed driven gear 43, the fourth-speed driven gear 44, the fifth-speed driven gear 45, and the sixth-speed driven gear 46 are cylindrical gears such as spur gears. FIG. 4 is a perspective view illustrating a schematic configuration of the fifth-speed driven gear 45 as an example. The first-speed driven gear 41, the second-speed driven gear 42, the third-speed driven gear 43, the fourth-speed driven gear 44, the fifth-speed driven gear 45, and the sixth-speed driven gear 46 may be spiral gears and the like as long as these gears are cylindrical gears.

As illustrated in FIG. 4, the fifth-speed driven gear 45 includes a fifth-speed driven gear body 45a and a plurality of fifth-speed dog projections 45b (second dog portions, dog projections). The fifth-speed driven gear body 45a is a flat ring-shaped member through which the counter shaft 22 penetrates. The fifth-speed driven gear body 45a includes a fifth-speed driven gear tooth portion 45c on an outer peripheral portion thereof. The fifth-speed driven gear tooth portion 45c always meshes with the fifth-speed driving gear tooth portion 35a of the fifth-speed driving gear 35.

In the fifth-speed driven gear 45, the fifth-speed driven gear tooth portion 45c is provided at a position overlapping with the first slider 61 when seen in the axial direction of the counter shaft 22. Specifically, when seen in the axial direction of the counter shaft 22, the fifth-speed driving gear tooth portion 35a that always meshes with the fifth-speed driven gear tooth portion 45c is located at a position overlapping with the first slider 61 (see FIGS. 6 and 7).

As illustrated in FIG. 4, the plurality of fifth-speed dog projections 45b project from the fifth-speed driven gear body 45a toward the first slider 61 in the axial direction of the counter shaft 22 (in the thickness direction of the fifth-speed driven gear body 45a). That is, the plurality of fifth-speed dog projections 45b are provided to face the first dog recesses 61c of the first slider 61. The plurality of fifth-speed dog projections 45b are arranged on the fifth-speed driven gear body 45a at regular intervals in the circumferential direction, and have the same shape. Each of the fifth-speed dog projections 45b is rectangular when seen in the axial direction of the counter shaft 22. In this embodiment, the fifth-speed driven gear body 45a is provided with six fifth-speed dog projections 45b.

As illustrated in FIG. 2, the first-speed driven gear 41 includes a first-speed driven gear body 41a and the plurality of first-speed dog projections 41b. The first-speed driven gear body 41a is a flat ring-shaped member through which the counter shaft 22 penetrates. The first-speed driven gear body 41a includes a first-speed driven gear tooth portion 41c on an outer peripheral portion thereof. The first-speed driven gear tooth portion 41c always meshes with the first-speed driving gear tooth portion 31a of the first-speed driving gear 31.

The plurality of first-speed dog projections 41b project from the first-speed driven gear body 41a toward the first slider 61 in the axial direction of the counter shaft 22 (in the thickness direction of the first-speed driven gear body 41a). That is, the plurality of first-speed dog projections 41b are provided to face the first dog recesses 61c of the first slider 61. The plurality of first-speed dog projections 41b are located near the inner periphery on a side surface of the ring-shaped first-speed driven gear body 41a. The plurality of first-speed dog projections 41b are arranged on the first-speed driven gear body 41a at regular intervals in the circumferential direction, and have the same shape. Each of the first-speed dog projections 41b is rectangular when seen in the axial direction of the counter shaft 22. In this embodiment, the first-speed driven gear body 41a is provided with six first-speed dog projections 41b.

The second-speed driven gear 42 includes a second-speed driven gear body 42a and a plurality of second-speed dog projections 42b. The second-speed driven gear body 42a is a flat ring-shaped member through which the counter shaft 22 penetrates. The second-speed driven gear body 42a includes a second-speed driven gear tooth portion 42c on an outer peripheral portion thereof. The second-speed driven gear tooth portion 42c always meshes with the second-speed driving gear tooth portion 32a of the second-speed driving gear 32.

The plurality of second-speed dog projections 42b project from the second-speed driven gear body 42a toward the third slider 63 in the axial direction of the counter shaft 22 (in the thickness direction of the second-speed driven gear body 42a). That is, the plurality of second-speed dog projections 42b are provided to face the third dog recesses 63c of the third slider 63. The plurality of second-speed dog projections 42b are located near the inner periphery on a side surface of the ring-shaped second-speed driven gear body 42a. The plurality of second-speed dog projections 42b are arranged on the second-speed driven gear body 42a at regular intervals in the circumferential direction, and have the same shape. Each of the second-speed dog projections 42b is rectangular when seen in the axial direction of the counter shaft 22. In this embodiment, the second-speed driven gear body 42a is provided with six second-speed dog projections 42b.

The third-speed driven gear 43 includes a third-speed driven gear body 43a and a plurality of third-speed dog projections 43b. The third-speed driven gear body 43a is a flat ring-shaped member through which the counter shaft 22 penetrates. The third-speed driven gear body 43a includes a third-speed driven gear tooth portion 43c on an outer peripheral portion thereof. The third-speed driven gear tooth portion 43c always meshes with the third-speed driving gear tooth portion 33a of the third-speed driving gear 33.

The plurality of third-speed dog projections 43b project from the third-speed driven gear body 43a toward the second slider 62 in the axial direction of the counter shaft 22 (in the thickness direction of the third-speed driven gear body 43a). That is, the plurality of third-speed dog projections 43b are provided to face the second dog recesses 62c of the second slider 62. The plurality of third-speed dog projections 43b are located near the inner periphery on a side surface of the ring-shaped third-speed driven gear body 43a. The plurality of third-speed dog projections 43b are arranged on the third-speed driven gear body 43a at regular intervals in the circumferential direction, and have the same shape. Each of the third-speed dog projections 43b is rectangular when seen in the axial direction of the counter shaft 22. In this embodiment, the third-speed driven gear body 43a is provided with six third-speed dog projections 43b.

The fourth-speed driven gear 44 includes a fourth-speed driven gear body 44a and a plurality of fourth-speed dog projections 44b. The fourth-speed driven gear body 44a is a flat ring-shaped member through which the counter shaft 22 penetrates. The fourth-speed driven gear body 44a includes a fourth-speed driven gear tooth portion 44c on an outer peripheral portion thereof. The fourth-speed driven gear tooth portion 44c always meshes with the fourth-speed driving gear tooth portion 34a of the fourth-speed driving gear 34.

The plurality of fourth-speed dog projections 44b project from the fourth-speed driven gear body 44a toward the third slider 63 in the axial direction of the counter shaft 22 (in the thickness direction of the fourth-speed driven gear body 44a). That is, the plurality of fourth-speed dog projections 44b are provided to face the third dog recesses 63c of the third slider 63. The plurality of fourth-speed dog projections 44b are located near the inner periphery on a side surface of the ring-shaped fourth-speed driven gear body 44a. The plurality of fourth-speed dog projections 44b are arranged on the fourth-speed driven gear body 44a at regular intervals in the circumferential direction, and have the same shape. Each of the fourth-speed dog projections 44b is rectangular when seen in the axial direction of the counter shaft 22. In this embodiment, the fourth-speed driven gear body 44a is provided with six fourth-speed dog projections 44b.

The sixth-speed driven gear 46 includes a sixth-speed driven gear body 46a and a plurality of sixth-speed dog projections 46b. The sixth-speed driven gear body 46a is a flat ring-shaped member through which the counter shaft 22 penetrates. The sixth-speed driven gear body 46a includes a sixth-speed driven gear tooth portion 46c on an outer peripheral portion thereof. The sixth-speed driven gear tooth portion 46c always meshes with the sixth-speed driving gear tooth portion 36a of the sixth-speed driving gear 36.

In the sixth-speed driven gear 46, the sixth-speed driven gear tooth portion 46c is provided at a position overlapping with the second slider 62 when seen in the axial direction of the counter shaft 22. Specifically, when seen in the axial direction of the counter shaft 22, the sixth-speed driving gear tooth portion 36a that always meshes with the sixth-speed driven gear tooth portion 46c is located at a position overlapping with the second slider 62.

The plurality of sixth-speed dog projections 46b project from the sixth-speed driven gear body 46a toward the second slider 62 in the axial direction of the counter shaft 22 (in the thickness direction of the sixth-speed driven gear body 46a). That is, the plurality of sixth-speed dog projections 46b are provided to face the second dog recesses 62c of the second slider 62. The plurality of sixth-speed dog projections 46b are located near the inner periphery on a side surface of the ring-shaped sixth-speed driven gear body 46a. The plurality of sixth-speed dog projections 46b are arranged on the sixth-speed driven gear body 46a at regular intervals in the circumferential direction, and have the same shape. Each of the sixth-speed dog projections 46b is rectangular when seen in the axial direction of the counter shaft 22. In this embodiment, the sixth-speed driven gear body 46a is provided with six sixth-speed dog projections 46b.

Each of the first-speed dog projections 41b, the second-speed dog projections 42b, the third-speed dog projections 43b, the fourth-speed dog projection 44b, the fifth-speed dog projections 45b, and the sixth-speed dog projections 46b has an R portion at the proximal end thereof. In this embodiment, each R portion has a center of curvature at the outside of each member.

Specifically, in the first-speed dog projections 41b, the cross-sectional area orthogonal to the projection direction of the first-speed dog projections 41b increases toward the first-speed driven gear body 41a. In the second-speed dog projections 42b, the cross-sectional area orthogonal to the projecting direction of the second-speed dog projections 42b increases toward the second-speed driven gear body 42a. In the third-speed dog projections 43b, the cross-sectional area orthogonal to the projecting direction of the third-speed dog projections 43b increases toward the third-speed driven gear body 43a. In the fourth-speed dog projections 44b, the cross-sectional area orthogonal to the projecting direction of the fourth-speed dog projections 44b increases toward the fourth-speed driven gear body 44a. In the fifth-speed dog projections 45b, the cross-sectional area orthogonal to the projecting direction of the fifth-speed dog projections 45b increases toward the fifth-speed driven gear body 45a. In the sixth-speed dog projections 46b, the cross-sectional area orthogonal to the projecting direction of the sixth-speed dog projections 46b increases toward the sixth-speed driven gear body 46a.

In the transmission mechanism 20 having the configuration described above, the sequential shift mechanism 50 causes the plurality of sliders 60 to move in the axial direction of the counter shaft 22 so that the dog projections of a driven gear are located in the dog recesses of a slider.

The sequential shift mechanism 50 is driven by a shift operation in shifting gear stages in the vehicle 1. The shift operation includes at least one of an operation by a driver of the vehicle 1 or an operation performed in the case of automatically shifting gear stages in accordance with, for example, the vehicle speed and the engine rotation speed in the transmission 12.

Figure 5:
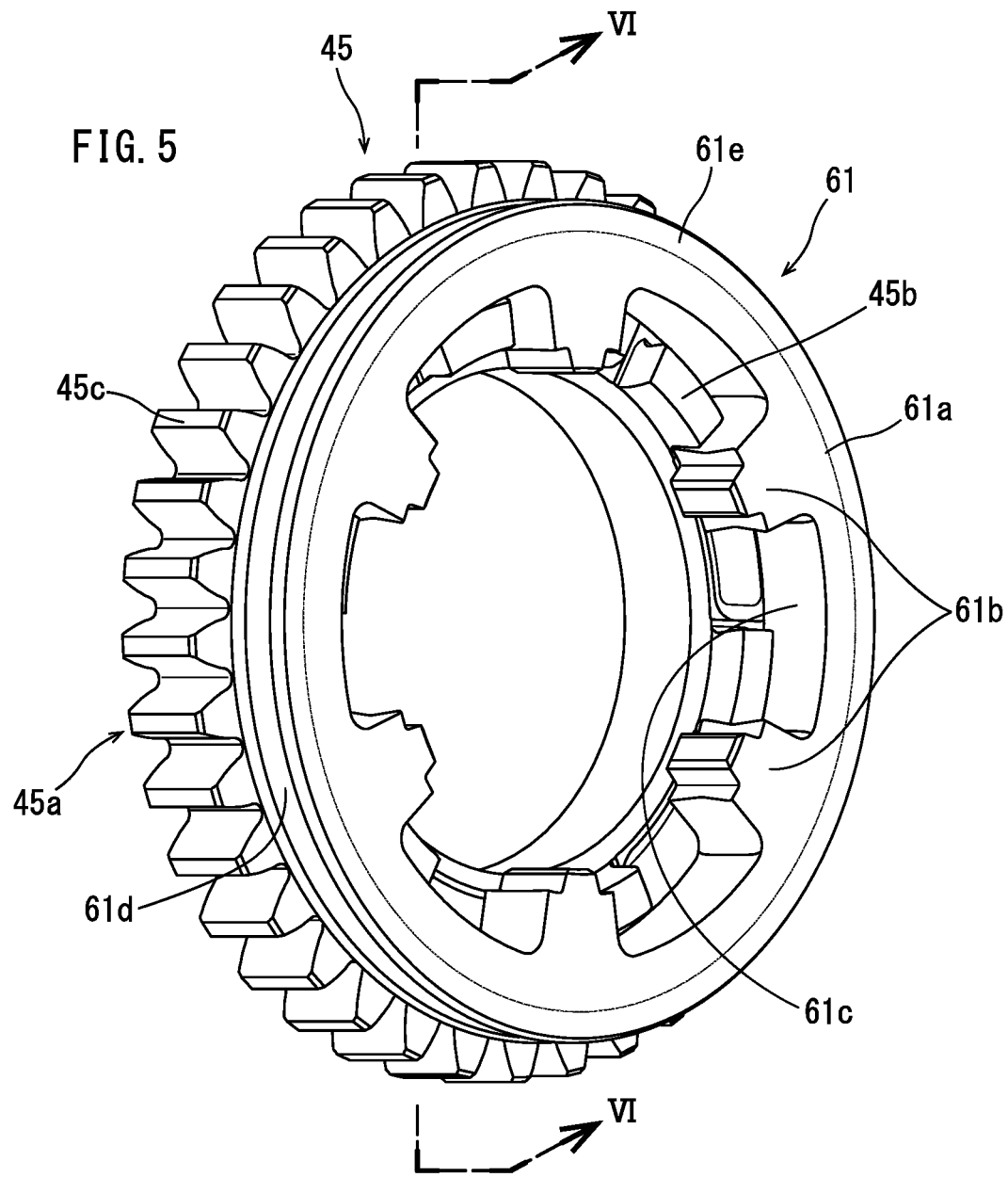
FIG. 5 is a perspective view illustrating a state where the first slider and the fifth-speed driven gear mesh with each other.
Figure 6:
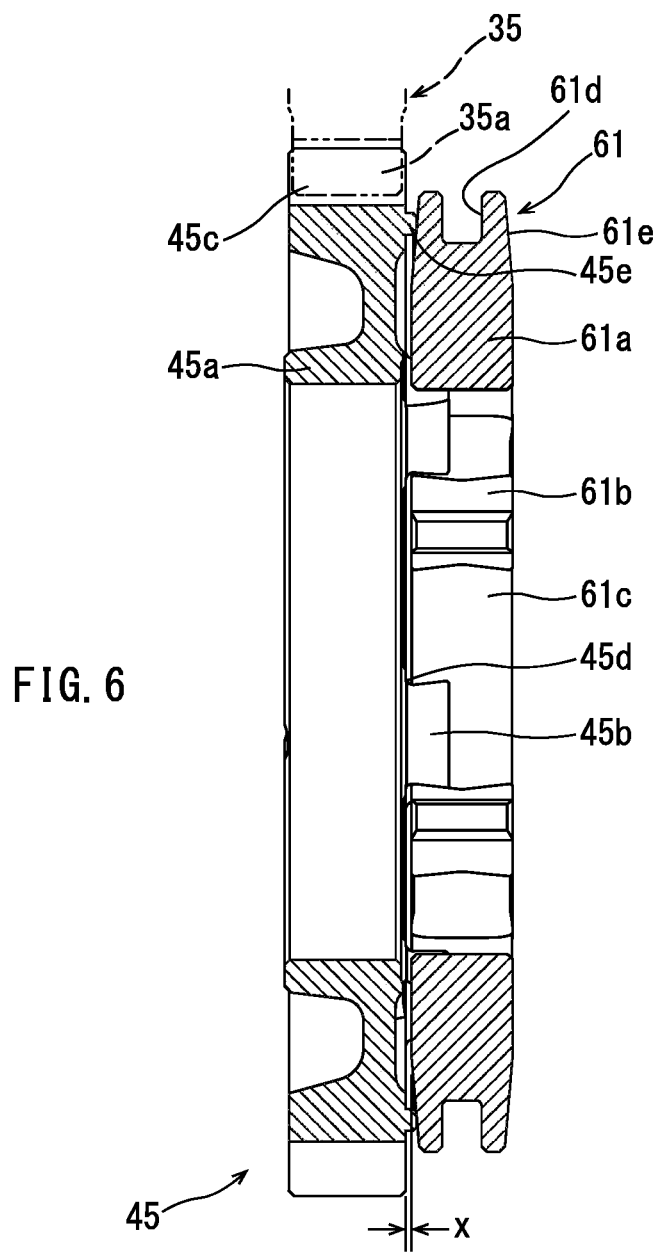
FIG. 6 is a cross-sectional view taken along the line VI-VI in FIG. 5.

As an example of the state where the dog projections of the driven gear are located in the dog recesses of the slider, FIGS. 5 and 6 illustrate a state where the fifth-speed dog projections 45b of the fifth-speed driven gear 45 are located in the first dog recesses 61c of the first slider 61. FIG. 6 is a cross-sectional view taken along the line VI-VI in FIG. 5. As illustrated in FIGS. 5 and 6, a state where the dog projections are located in the dog recesses, and a driving force can be transferred by the dog projections and the dog recesses will be referred to as a state where the dog projections mesh with the dog recesses.

Although not specifically shown, when the first shift fork 52 moves in the axial direction of the shift cam 51 with the rotation of the shift cam 51 of the sequential shift mechanism 50, the first slider 61 moves in the axial direction of the counter shaft 22 toward the fifth-speed driven gear 45. Accordingly, as illustrated in FIGS. 5 and 6, the fifth-speed dog projections 45b of the fifth-speed driven gear 45 are located in the first dog recesses 61c of the first slider 61.

As described above, the fifth-speed dog projections 45b of the fifth-speed driven gear 45 are located in the first dog recesses 61c of the first slider 61 so that the first slider 61 and the fifth-speed driven gear 45 are rotatable together. Accordingly, the rotation of the fifth-speed driven gear 45 that always meshes with the fifth-speed driving gear 35 is transferred to the counter shaft 22 through the first slider 61. Thus, rotation can be transferred from the main shaft 21 to the counter shaft 22 at a gear-shift ratio of the fifth speed through the fifth-speed driving gear 35, the fifth-speed driven gear 45, and the first slider 61.

Although not specifically shown, when the first shift fork 52 moves in the axial direction of the shift cam 51 with rotation of the shift cam 51 of the sequential shift mechanism 50, the first slider 61 moves in the axial direction of the counter shaft 22 toward the first-speed driven gear 41. Accordingly, the first-speed dog projections 41b of the first-speed driven gear 41 are located in the first dog recesses 61c of the first slider 61.

As described above, the first-speed dog projections 41b of the first-speed driven gear 41 are located in the first dog recesses 61c of the first slider 61 so that the first slider 61 and the first-speed driven gear 41 are rotatable together. Accordingly, rotation of the first-speed driven gear 41 that always meshes with the first-speed driving gear 31 is transferred to the counter shaft 22 through the first slider 61. Thus, rotation can be transferred from the main shaft 21 to the counter shaft 22 at a gear-shift ratio of the first speed through the first-speed driving gear 31, the first-speed driven gear 41, and the first slider 61.

Although not specifically shown, when the third shift fork 54 moves in the axial direction of the shift cam 51 with rotation of the shift cam 51 of the sequential shift mechanism 50, the third slider 63 moves in the axial direction of the counter shaft 22 toward the second-speed driven gear 42. Accordingly, the second-speed dog projections 42b of the second-speed driven gear 42 are located in the third dog recesses 63c of the third slider 63.

As described above, the second-speed dog projections 42b of the second-speed driven gear 42 are located in the third dog recesses 63c of the third slider 63 so that the third slider 63 and the second-speed driven gear 42 are rotatable together. Accordingly, rotation of the second-speed driven gear 42 that always meshes with the second-speed driving gear 32 is transferred to the counter shaft 22 through the third slider 63. Thus, rotation can be transferred from the main shaft 21 to the counter shaft 22 at a gear-shift ratio of the second speed through the second-speed driving gear 32, the second-speed driven gear 42, and the third slider 63.

Although not specifically shown, when the second shift fork 53 moves in the axial direction of the shift cam 51 with rotation of the shift cam 51 of the sequential shift mechanism 50, the second slider 62 moves in the axial direction of the counter shaft 22 toward the third-speed driven gear 43. Accordingly, the third-speed dog projections 43b of the third-speed driven gear 43 are located in the second dog recesses 62c of the second slider 62.

As described above, the third-speed dog projections 43b of the third-speed driven gear 43 are located in the second dog recesses 62c of the second slider 62 so that the second slider 62 and the third-speed driven gear 43 are rotatable together. Accordingly, rotation of the third-speed driven gear 43 that always meshes with the third-speed driving gear 33 is transferred to the counter shaft 22 through the second slider 62. Thus, rotation can be transferred from the main shaft 21 to the counter shaft 22 at a gear-shift ratio of the third speed through the third-speed driving gear 33, the third-speed driven gear 43, and the second slider 62.

Although not specifically shown, when the third shift fork 54 moves in the axial direction of the shift cam 51 with rotation of the shift cam 51 of the sequential shift mechanism 50, the third slider 63 moves in the axial direction of the counter shaft 22 toward the fourth-speed driven gear 44. Accordingly, the fourth-speed dog projections 44b of the fourth-speed driven gear 44 are located in the third dog recesses 63c of the third slider 63.

As described above, the fourth-speed dog projections 44b of the fourth-speed driven gear 44 are located in the third dog recesses 63c of the third slider 63 so that the third slider 63 and the fourth-speed driven gear 44 are rotatable together. Accordingly, rotation of the fourth-speed driven gear 44 that always meshes with the fourth-speed driving gear 34 is transferred to the counter shaft 22 through the third slider 63. Thus, rotation can be transferred from the main shaft 21 to the counter shaft 22 at a gear-shift ratio of the fourth speed through the fourth-speed driving gear 34, the fourth-speed driven gear 44, and the third slider 63.

Although not specifically shown, when the second shift fork 53 moves in the axial direction of the shift cam 51 with rotation of the shift cam 51 of the sequential shift mechanism 50, the second slider 62 moves in the axial direction of the counter shaft 22 toward the sixth-speed driven gear 46. Accordingly, the sixth-speed dog projections 46b of the sixth-speed driven gear 46 are located in the second dog recesses 62c of the second slider 62.

As described above, the sixth-speed dog projections 46b of the sixth-speed driven gear 46 are located in the second dog recesses 62c of the second slider 62 so that the second slider 62 and the sixth-speed driven gear 46 are rotatable together. Accordingly, rotation of the sixth-speed driven gear 46 that always meshes with the sixth-speed driving gear 36 is transferred to the counter shaft 22 through the second slider 62. Thus, rotation can be transferred from the main shaft 21 to the counter shaft 22 at a gear-shift ratio of the sixth speed through the sixth-speed driving gear 36, the sixth-speed driven gear 46, and the second slider 62.

As described above, in the transmission mechanism 20, the plurality of sliders 60 are caused to move in the axial direction along the counter shaft 22 by the sequential shift mechanism 50 in accordance with a shift operation. Accordingly, the transmission mechanism 20 is capable of transferring rotation from the main shaft 21 to the counter shaft 22 at a predetermined gear-shift ratio in each gear stage.

As described above, since the first-speed dog projections 41b include the R portions at the proximal ends thereof, the R portions contact peripheral portions of the first dog recesses 61c in the state where the first-speed dog projections 41b are located in the first dog recesses 61c of the first slider 61. Since the second-speed dog projections 42b include the R portions at the proximal ends thereof, the R portions contact peripheral portions of the third dog recesses 63c in the state where the second-speed dog projections 42b are located in the third dog recesses 63c of the third slider 63. Since the third-speed dog projections 43b include the R portions at the proximal ends thereof, the R portions contact peripheral portions of the second dog recesses 62c in the state where the third-speed dog projections 43b are located in the second dog recesses 62c of the second slider 62. Since the fourth-speed dog projections 44b include the R portions at the proximal ends thereof, the R portions contact peripheral portions of the third dog recesses 63c in the state where the fourth-speed dog projections 44b are located in the third dog recesses 63c of the third slider 63. Since the fifth-speed dog projections 45b include the R portions at the proximal ends thereof, the R portions contact peripheral portions of the first dog recesses 61c in the state where the fifth-speed dog projections 45b are located in the first dog recesses 61c of the first slider 61. Since the sixth-speed dog projections 46b include the R portions at the proximal ends thereof, the R portions contact peripheral portions of the second dog recesses 62c in the state where the sixth-speed dog projections 46b are located in the second dog recesses 62c of the second slider 62. The first dog recesses 61c, the third dog recesses 63c, and the second dog recesses 62c described above are dog portions that are not dog projections.

Figure 7:
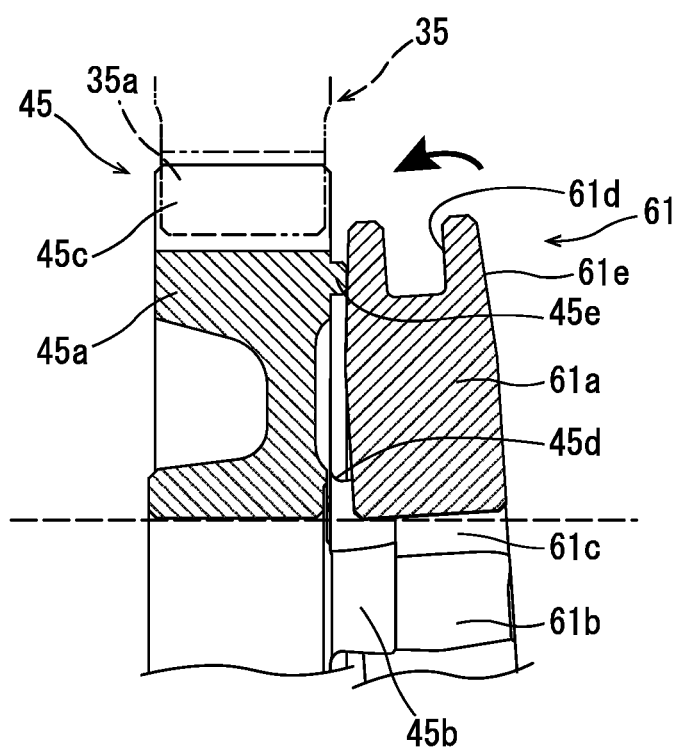
FIG. 7 is an enlarged cross-sectional view illustrating a state where the first slider tilts relative to the fifth-speed driven gear.
Figure 8:
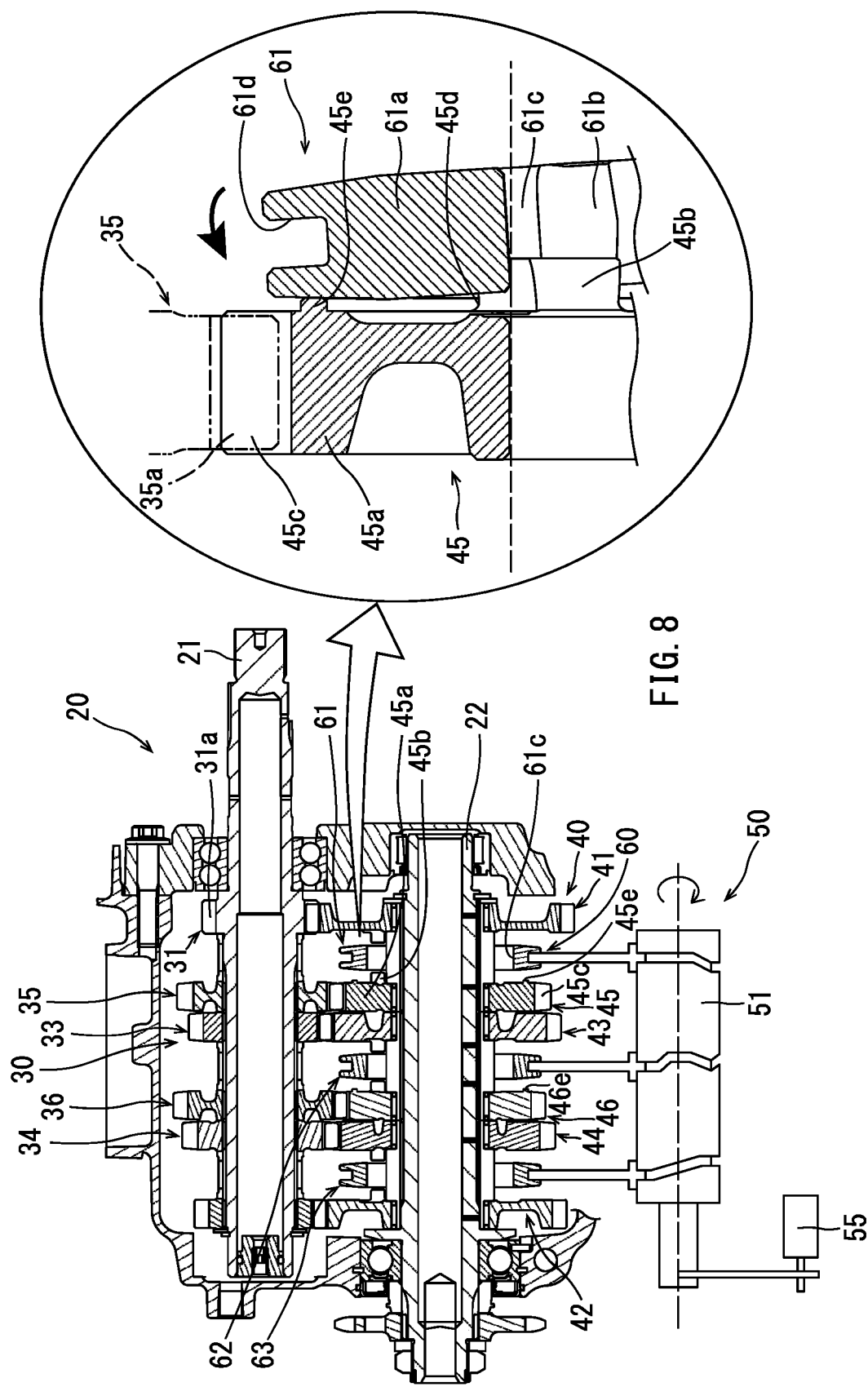
FIG. 8 illustrates a schematic configuration of the transmission and a schematic view of a state where the first slider tilts relative to the fifth-speed driven gear.

As an example, FIGS. 6 through 8 illustrate an R portion 45d provided at the proximal end of the fifth-speed dog projection 45b. As illustrated in FIG. 6, in the state where the fifth-speed dog projection 45b of the fifth-speed driven gear 45 is located in the first dog recess 61c of the first slider 61, the R portion 45d of the fifth-speed dog projection 45b contacts a peripheral portion of the first dog recess 61c. Accordingly, a gap of a distance X is formed between the fifth-speed driven gear 45 and the first slider 61.

Although not specifically shown, even in the state where the first-speed dog projections 41b of the first-speed driven gear 41 are located in the first dog recesses 61c of the first slider 61, a gap is formed between the first-speed driven gear 41 and the first slider 61. A gap is also formed between the second-speed driven gear 42 and the third slider 63 even in the state where the second-speed dog projections 42b of the second-speed driven gear 42 are located in the third dog recesses 63c of the third slider 63. A gap is also formed between the third-speed driven gear 43 and the second slider 62 even in the state where the third-speed dog projections 43b of the third-speed driven gear 43 are located in the second dog recesses 62c of the second slider 62. A gap is also formed between the fourth-speed driven gear 44 and the third slider 63 even in the state where the fourth-speed dog projections 44b of the fourth-speed driven gear 44 are located in the third dog recesses 63c of the third slider 63. A gap is also formed between the sixth-speed driven gear 46 and the second slider 62 even in the state where the sixth-speed dog projections 46b of the sixth-speed driven gear 46 are located in the second dog recesses 62c of the second slider 62.

At least one of the first slider 61, the second slider 62, and the third slider 63 might fall and tilt in the axial direction in moving in the axial direction along the counter shaft 22 by the sequential shift mechanism 50.

FIG. 7 schematically illustrates a case where the first slider 61 falls and tilts in the axial direction of the counter shaft 22 in moving toward the fifth-speed driven gear 45 along the counter shaft 22. In FIG. 7, dot-dot-dash lines are parallel to the axis of the counter shaft 22. In FIG. 7, the direction in which the first slider 61 tilts is indicated by a solid arrow.

As illustrated in FIGS. 6 and 7, when seen in the axial direction of the counter shaft 22, the fifth-speed driven gear tooth portion 45c of the fifth-speed driven gear 45 and the fifth-speed driving gear tooth portion 35a always meshing with the fifth-speed driven gear tooth portion 45c are located at positions overlapping with the first slider 61.

As illustrated in FIG. 7, in a case where the first slider 61 falls and tilts in the axial direction of the counter shaft 22, an outer peripheral portion of the first slider 61 approaches the fifth-speed driving gear tooth portion 35a and the fifth-speed driven gear tooth portion 45c. Then, the outer peripheral portion of the first slider 61 might contact the fifth-speed driving gear tooth portion 35a.

On the other hand, in this embodiment, as illustrated in FIGS. 4, 6, and 7, the fifth-speed driven gear 45 includes a fifth-speed driven gear protrusion 45e protruding from the fifth-speed driven gear body 45a toward the first slider 61 in the axial direction of the counter shaft 22. That is, the fifth-speed driven gear protrusion 45e is provided on the side surface of the fifth-speed driven gear body 45a on which the fifth-speed dog projections 45b are provided. Thus, the direction in which the fifth-speed driven gear protrusion 45e protrudes is the same as the direction in which the fifth-speed dog projections 45b project.

The fifth-speed driven gear protrusion 45e is formed in a ring shape on the side surface of the fifth-speed driven gear body 45a at a location close to fifth-speed driven gear tooth portion 45c when seen in the axial direction of the counter shaft 22. The fifth-speed driven gear protrusion 45e is disposed on a portion of the fifth-speed driven gear body 45a facing the first slider 61. The fifth-speed driven gear protrusion 45e is located only on a portion of the side surface of the fifth-speed driven gear body 45a closer to the radially outer peripheral end than the counter shaft 22, and is configured to contact the first slider 61 when the first slider 61 falls toward the fifth-speed driven gear 45 in the axial direction of the counter shaft 22. Specifically, the fifth-speed driven gear protrusion 45e protrudes in the axial direction such that the fifth-speed driven gear protrusion 45e supports the first slider 61 and the fifth-speed driven gear 45 between the first slider 61 and the fifth-speed driven gear 45 when the first slider 61 falls toward the fifth-speed driven gear 45 in the axial direction of the counter shaft 22.

The protrusion length of the fifth-speed driven gear protrusion 45e is smaller than the projection length of the fifth-speed dog projections 45b. The protrusion length of the fifth-speed driven gear protrusion 45e is smaller than a distance X of a gap formed between the fifth-speed driven gear 45 and the first slider 61 by contact between the R portions 45d of the fifth-speed dog projections 45b and the peripheral portion of the first dog recesses 61c in the state where the fifth-speed dog projections 45b of the fifth-speed driven gear 45 are located in the first dog recesses 61c of the first slider 61.

The fifth-speed driven gear protrusion 45e provided on the fifth-speed driven gear 45 as described above causes an outer peripheral portion of the first slider 61 to contact the fifth-speed driven gear protrusion 45e in a case where the first slider 61 falls and tilts in the axial direction of the counter shaft 22. Thus, it is possible to prevent the first slider 61 from contacting the fifth-speed driving gear tooth portion 35a of the fifth-speed driving gear 35.

In addition, the fifth-speed driven gear protrusion 45e is not provided on the first slider 61. This can prevent an increase in the weight of the first slider 61. Accordingly, it is possible to avoid difficulty in movement of the first slider 61 in the axial direction by an increase in the weight of the first slider 61.

In addition, as described above, the fifth-speed driven gear protrusion 45e is provided only on a portion of the fifth-speed driven gear 45 facing the first slider 61 and located closer to the radially outer peripheral end than the counter shaft 22. Accordingly, in addition to suppression of an increase in the weight of the fifth-speed driven gear 45, advantages described above can be obtained.

As described above, the protrusion length of the fifth-speed driven gear protrusion 45e is smaller than the projection length of the fifth-speed dog projections 45b. Accordingly, it is possible to prevent the fifth-speed driven gear protrusion 45e from hindering insertion of the fifth-speed dog projections 45b of the fifth-speed driven gear 45 in the first dog recesses 61c of the first slider 61.

In addition, the protrusion length of the fifth-speed driven gear protrusion 45e is smaller than the distance X of a gap formed between the fifth-speed driven gear 45 and the first slider 61 by contact of the R portions 45d of the fifth-speed dog projections 45b with a peripheral portion of the first dog recesses 61c in the state where the fifth-speed dog projections 45b of the fifth-speed driven gear 45 are located in the first dog recesses 61c of the first slider 61. Accordingly, the first slider 61 does not tilt in the axial direction of the counter shaft 22, and it is possible to prevent the first slider 61 from contacting the fifth-speed driven gear protrusion 45e when the fifth-speed dog projections 45b of the fifth-speed driven gear 45 mesh with the first dog recesses 61c of the first slider 61. Thus, it is possible to prevent the fifth-speed driven gear protrusion 45e from hindering meshing between the fifth-speed dog projections 45b of the fifth-speed driven gear 45 and the first dog recesses 61c of the first slider 61.

The configuration described above can suppress a tilt of the first slider 61 in the axial direction of the counter shaft 22 and reduce the thickness of the first slider 61 for downsizing.

The fifth-speed driven gear protrusion 45e is formed in a ring shape on the fifth-speed driven gear 45 when seen in the axial direction of the counter shaft 22. Accordingly, even when the first slider 61 tilts in the axial direction of the counter shaft 22, the fifth-speed driven gear protrusion 45e can be located between the first slider 61 and the fifth-speed driven gear body 45a with a minimum gap between the first slider 61 and the fifth-speed driven gear body 45a, as intended. Thus, in the case where the first slider 61 tilts in the axial direction of the counter shaft 22, it is further ensured to prevent the first slider 61 from contacting the fifth-speed driving gear 35 that always meshes with the fifth-speed driven gear 45.

In this embodiment, when seen in the axial direction of the counter shaft 22, the sixth-speed driven gear tooth portion 46c of the sixth-speed driven gear 46 and the sixth-speed driving gear tooth portion 36a always meshing with the sixth-speed driven gear tooth portion 46c are located at positions overlapping with the second slider 62.

Thus, as illustrated in FIG. 2, in a manner similar to the fifth-speed driven gear 45 described above, the sixth-speed driven gear 46 also includes a sixth-speed driven gear protrusion 46e. The sixth-speed driven gear protrusion 46e protrudes from the sixth-speed driven gear body 46a toward the second slider 62 in the axial direction of the counter shaft 22. When the second slider 62 falls and tilts in the axial direction of the counter shaft 22, an outer peripheral portion of the second slider 62 contacts the sixth-speed driven gear protrusion 46e. Accordingly, it is possible to prevent the outer peripheral portion of the second slider 62 from contacting the sixth-speed driving gear tooth portion 36a of the sixth-speed driving gear 36.

In a manner similar to the fifth-speed driven gear 45 described above, the sixth-speed driven gear protrusion 46e is also provided only on a portion of the sixth-speed driven gear 46 facing the second slider 62 and located closer to the radially outer peripheral end than the counter shaft 22. Accordingly, in addition to suppression of an increase in the weight of the sixth-speed driven gear 46, the advantages described above can be obtained.

In a manner similar to the fifth-speed driven gear 45 described above, the protrusion length of the sixth-speed driven gear protrusion 46e is also smaller than the projection length of the sixth-speed dog projections 46b. Accordingly, it is possible to prevent the sixth-speed driven gear protrusion 46e from hindering insertion of the sixth-speed dog projections 46b of the sixth-speed driven gear 46 in the second dog recesses 62c of the second slider 62.

In a manner similar to the fifth-speed driven gear 45, the protrusion length of the sixth-speed driven gear protrusion 46e is smaller than a distance of a gap formed between the sixth-speed driven gear 46 and the second slider 62 by contact of the R portions of the sixth-speed dog projections 46b with peripheral portions of the second dog recesses 62c in the state where the sixth-speed dog projections 46b of the sixth-speed driven gear 46 are located in the second dog recesses 62c of the second slider 62.

Accordingly, the second slider 62 does not tilt in the axial direction of the counter shaft 22, and it is possible to prevent the second slider 62 from contacting the sixth-speed driven gear protrusion 46e when the sixth-speed dog projections 46b of the sixth-speed driven gear 46 mesh with the second dog recesses 62c of the second slider 62. Thus, it is possible to prevent the sixth-speed driven gear protrusion 46e from hindering meshing between the sixth-speed dog projections 46b of the sixth-speed driven gear 46 and the second dog recesses 62c of the second slider 62.

The configuration described above can suppress a tilt of the second slider 62 in the axial direction of the counter shaft 22 and reduce the thickness of the second slider 62 for downsizing.

The sixth-speed driven gear protrusion 46e is formed in a ring shape on the sixth-speed driven gear 46 when seen in the axial direction of the counter shaft 22. Accordingly, even when the second slider 62 tilts in the axial direction of the counter shaft 22, the sixth-speed driven gear protrusion 46e can be located between the second slider 62 and the sixth-speed driven gear body 46a with a minimum gap between the second slider 62 and the sixth-speed driven gear body 46a, as intended. Thus, in the case where the second slider 62 tilts in the axial direction of the counter shaft 22, it is further ensured to prevent the second slider 62 from contacting the sixth-speed driving gear 36 that always meshes with the sixth-speed driven gear 46.

Other Embodiments

The embodiment of the present teaching has been described above, but the above embodiment is merely an example for carrying out the present teaching. Thus, the present teaching is not limited to the embodiment, and the embodiment may be modified as necessary within a range not departing from the gist of the present teaching.

In the embodiment described above, the fifth-speed driven gear 45 and the sixth-speed driven gear 46 include the fifth-speed driven gear protrusion 45*e* and the sixth-speed driven gear protrusion 46*e*, respectively. Alternatively, the fifth-speed driven gear and/or the sixth-speed driven gear may include a driven gear protrusion. At least one of the first-speed driven gear, the second-speed driven gear, the third-speed driven gear, and the fourth-speed driven gear may include a driven gear protrusion. In this case, a driven gear protrusion is preferably provided on a driven gear whose driven gear tooth portion overlaps with the slider when seen in the axial direction of the counter shaft so as to prevent the slider from contacting the driving gear tooth portion when the slider falls and tilts in the axial direction of the counter shaft. The slider may include a protrusion that contacts a driven gear when the slider falls and tilts. Both the slider and the driven gear may include protrusions.

In the embodiment described above, each of the fifth-speed driven gear protrusion 45*e* and the sixth-speed driven gear protrusion 46*e* has a ring shape when seen in the axial direction of the counter shaft 22. Alternatively, at least one of the fifth-speed driven gear protrusion or the sixth-speed driven gear protrusion may have a shape except for a ring shape, such as a rectangle or a triangle, when seen in the axial direction of the counter shaft 22. At least one of the fifth-speed driven gear protrusion or the sixth-speed driven gear protrusion may include a plurality of protrusions that are not connected to one another.

In the embodiment described above, the fifth-speed driven gear protrusion 45*e* is provided only on a portion of the fifth-speed driven gear 45 facing the first slider 61 and located closer to the radially outer peripheral end than the counter shaft 22. The sixth-speed driven gear protrusion 46*e* is provided only on a portion of the sixth-speed driven gear 46 facing the second slider 62 and located closer to the radially outer peripheral end than the counter shaft 22. Alternatively, the fifth-speed driven gear protrusion may be located at any position on the fifth-speed driven gear body, such as a position close to an inner peripheral portion of the fifth-speed driven gear body, as long as the fifth-speed driven gear protrusion can contact the first slider when the first slider falls and tilts. The sixth-speed driven gear protrusion may be disposed at any position on the sixth-speed driven gear body, such as a position close to an inner peripheral portion of the sixth-speed driven gear body, as long as the sixth-speed driven gear protrusion can contact the first slider when the first slider falls and tilts.

In the embodiment described above, the transmission 12 includes the transmission mechanism 20 having gear stages of six speeds. Alternatively, the transmission may include a transmission mechanism having gear stages of five speeds or less, or seven speeds or more.

The transmission mechanism may have a configuration other than the configuration of the embodiment described above.

For example, the transmission mechanism may include two or four or more sliders. The number of dog recesses provided on each slider and the number of dog projections provided on each driven gear may be five or less, or seven or more. Dog recesses may be provided on the driven gears with dog projections being provided on the sliders.

The slider may be provided on the main shaft. The slider may be provided on both of the main shaft and the counter shaft individually.

Instead of the slider, some of the plurality of driven gears may move along the counter shaft. In this case, dog recesses may be provided on driven gears that move in the axial direction along the counter shaft with dog projections being provided on the driven gears that do not move in the axial direction along the counter shaft, among the plurality of driven gears. Dog projections may be provided on driven gears that move in the axial direction along the counter shaft with dog recesses being provided on driven gears that do not move in the axial direction along the counter shaft, among the plurality of driven gears.

Some of the plurality of driving gears may move in the axial direction along the main shaft. In this case, dog recesses may be provided on driving gears that move in the axial direction along the counter shaft with dog projections being provided on driving gears that do not move in the axial direction along the counter shaft, among the plurality of driving gears. Dog projections may be provided on driving gears that move in the axial direction along the counter shaft with dog recesses being provided on driving gears that do not move in the axial direction along the counter shaft, among the plurality of driving gears.

As described above, in the case where at least one of the driven gear or the driving gear are caused to move instead of the slider, at least one of the moving gear and its adjacent gear only needs to include a protrusion that contacts the moving gear when the moving gear falls and tilts.

The driving gear protrusion may have a connected shape such as a ring, a rectangle, or a triangle, or may be constituted by a plurality of protrusions that are not connected to one another, when seen in the axial direction of the main shaft. The driven gear protrusion may have a connected shape such as a ring, a rectangle, or a triangle, or may be constituted by a plurality of protrusions that are not connected to one another, when seen in the axial direction of the counter shaft.

The driving gear protrusion may be provided at any location on the driving gear body. The driven gear protrusion may be provided at any location on the driven gear body.

In each embodiment described above, the vehicle 1 includes the engine 11 as a driving source. Alternatively, the driving source of the vehicle may be a motor. The driving source also may be a hybrid system that is a combination of an engine and a motor.

The embodiment described above has been directed to a motorcycle as an example of a vehicle, but the vehicle may be a vehicle except for a two-wheeled vehicle, as long as the vehicle includes a transmission.

REFERENCE SIGNS LIST

1 vehicle
2 vehicle body
10 engine unit
11 engine
12 transmission
20 transmission mechanism
21 main shaft 22 counter shaft
25 collar
30 driving gear
31 first-speed driving gear
31a first-speed driving gear tooth portion
32 second-speed driving gear
32a second-speed driving gear tooth portion
33 third-speed driving gear
33a third-speed driving gear tooth portion
34 fourth-speed driving gear
34a fourth-speed driving gear tooth portion
35 fifth-speed driving gear (second gear)
35a fifth-speed driving gear tooth portion
36 sixth-speed driving gear
36a sixth-speed driving gear tooth portion
40 driven gear
41 first-speed driven gear
41a first-speed driven gear body
41b first-speed dog projection
41c first-speed driven gear tooth portion
42 second-speed driven gear
42a second-speed driven gear body
42b second-speed dog projection
42c second-speed driven gear tooth portion
43 third-speed driven gear
43a third-speed driven gear body
43b third-speed dog projection
43c third-speed driven gear tooth portion
44 fourth-speed driven gear
44a fourth-speed driven gear body
44b fourth-speed dog projection
44c fourth-speed driven gear tooth portion
45 fifth-speed driven gear (first gear)
45a fifth-speed driven gear body
45b fifth-speed dog projection (second dog portion, dog projection)
45c fifth-speed driven gear tooth portion
45d R portion
45e fifth-speed driven gear protrusion
46 sixth-speed driven gear
46a sixth-speed driven gear body
46b sixth-speed dog projection
46c sixth-speed driven gear tooth portion
50 sequential shift mechanism
51 shift cam
51a to 51c cam groove
52 first shift fork
53 second shift fork
54 third shift fork
55 driving source
60 slider
61 first slider
61a first slider body
61b first slider projection
61c first dog recess (first dog portion)
61d first slider groove portion
61e first slider tapered portion
62 second slider
62c second dog recess
62d second slider groove portion
63 third slider
63c third dog recess
63d third slider groove portion

What is claimed is:

1. A transmission that changes a speed of rotation of a main shaft caused to rotate by a driving force output from a driving source and transfers rotation of the main shaft to a counter shaft, the transmission comprising:
   a first gear disposed on one of the main shaft or the counter shaft, the first gear being rotatable relative to the one of the main shaft or the counter shaft on which the first gear is disposed, the first gear being immovable in an axial direction of the one of the main shaft or the counter shaft on which the first gear is disposed;
   a second gear that meshes with the first gear, the second gear being disposed on the other of the main shaft or the counter shaft on which the first gear is not provided, the second gear being rotatable in synchronization with the other of the main shaft or the counter shaft on which the first gear is not provided, the second gear being immovable in an axial direction of the other of the main shaft or the counter shaft on which the first gear is not provided; and
   a slider disposed on the one of the main shaft or the counter shaft on which the first gear is disposed, the slider being rotatable in synchronization with the one of the main shaft or the counter shaft on which the first gear is disposed, the slider being movable in the axial direction of the one of the main shaft or the counter shaft on which the first gear is disposed, wherein
   the slider includes a first dog portion on an end portion in the axial direction of the one of the main shaft or the counter shaft on which the first gear is disposed, and is located to partially overlap with the second gear when seen in the axial direction,
   the first gear includes a second dog portion configured to mesh with the first dog portion,
   the first dog portion or the second dog portion is a dog projection projecting in the axial direction of the one of the main shaft or the counter shaft on which the first gear is disposed,
   at least one of the slider or the first gear includes a protrusion at a location closer to a radially outer periphery of the at least one of the slider or the first gear than the one of the main shaft or the counter shaft on which the first gear is disposed,
   the protrusion protrudes in the axial direction of the one of the main shaft or the counter shaft on which the first gear is disposed, to support the slider and the first gear between the slider and the first gear when the slider tilts in the axial direction, and
   the protrusion has a protrusion length smaller than a projection length of the dog projection.

2. The transmission according to claim 1, wherein
   a proximal end of the dog projection includes an R portion configured to contact one of the first dog portion or the second dog portion that is not the dog projection in a state where the slider moves in the axial direction of the one of the main shaft or the counter shaft on which the first gear is disposed so that the first dog portion and the second dog portion mesh with each other, and
   the protrusion length of the protrusion is smaller than a dimension of a gap formed between the slider and the first gear when the slider moves in the axial direction of the one of the main shaft or the counter shaft on which the first gear is disposed and the R portion of the dog projection contacts the one of the first dog portion or the second dog portion that is not the dog projection.

3. The transmission according to claim 1, wherein
   the protrusion is of a ring shape on at least one of the slider or the first gear when seen in the axial direction of the one of the main shaft or the counter shaft on which the first gear is disposed.

4. The transmission according to claim 1, wherein
the protrusion includes a plurality of protrusions provided on at least one of the slider or the first gear.

5. The transmission according to claim 1, wherein
the protrusion is provided on the first gear.

6. The transmission according to claim 1, wherein
the first dog portion of the slider is a recess, and the slider is located at one end of the one of the main shaft or the counter shaft in the axial direction thereof, and the second dog portion of the first gear is the dog projection that is disposed on a side surface of the first gear that faces a side surface of the slider, the dog projection projecting in the axial direction of the one of the main shaft or the counter shaft, and being configured to mesh with the first dog portion.

* * * * *